(12) United States Patent  
Spratt et al.

(10) Patent No.: US 9,170,432 B2  
(45) Date of Patent: Oct. 27, 2015

(54) LOW DISTORTION EYEWEAR LENS WITH LOW OPTICAL POWER

(71) Applicants: Carl Zeiss Vision Inc., San Diego, CA (US); Carl Zeiss Vision International GmbH, Aalen (DE); Carl Zeiss Vision Italia S.p.A., Castiglione Olona (IT)

(72) Inventors: Ray Steven Spratt, Petaluma, CA (US); Sabrina Malnati, Lozza (IT); Wolf Krause, Essigen (DE)

(73) Assignees: Carl Zeiss Vision International GmbH, Aalen (DE); Carl Zeiss Vision Inc., San Diego, CA (US); Carl Zeiss Vision Italia S.P.A., Casriglione Olona Varese (IT)

( * ) Notice: Subject to any disclaimer, the term of this patent is extended or adjusted under 35 U.S.C. 154(b) by 13 days.

(21) Appl. No.: 14/285,303

(22) Filed: May 22, 2014

(65) Prior Publication Data

US 2014/0253874 A1  Sep. 11, 2014

Related U.S. Application Data

(63) Continuation of application No. PCT/US2011/062536, filed on Nov. 30, 2011.

(51) Int. Cl.  
*G02C 7/02* (2006.01)  
*G02B 13/18* (2006.01)  
*B29D 11/00* (2006.01)

(52) U.S. Cl.  
CPC ............ *G02C 7/02* (2013.01); *B29D 11/00019* (2013.01); *G02C 2202/22* (2013.01)

(58) Field of Classification Search  
CPC .... G02C 7/02; G02C 7/024; B29D 11/00009; B29D 11/00019

USPC ............ 351/159.01, 159.41–159.49, 159.71, 351/159.72, 159.75, 159.76; 359/642  
See application file for complete search history.

(56) References Cited

U.S. PATENT DOCUMENTS

| 5,767,939 A | 6/1998 | Komatsu et al. |
| 6,056,401 A | 5/2000 | Shirayanagi |
| 2005/0122470 A1 | 6/2005 | Perrott et al. |

FOREIGN PATENT DOCUMENTS

| WO | WO 99/63392 | 12/1999 |
| WO | WO 2006/056847 | 6/2006 |

OTHER PUBLICATIONS

*Borish's Clinical Refraction*, 2nd Ed., William J. Benjamin, St. Louis: Butterworth-Heinemann, 2006. Chapter 23, pp. 1069, 1072 and 1074.  
International Search Report for corresponding PCT Appl No. PCT/US2011/062536, dated Sep. 4, 2012.  
Clinical Optics, 2nd Ed., Troy E. Fannin and Theodore Grosvenor, Butterworth-Heinemann (St. Louis, MO, 1996); pp. 125, 139-140; pp. 134-135, 144.  
International Preliminary Report on Patentability for corresponding PCT Appl No. PCT/US2011/062536, dated Jun. 3, 2014.

*Primary Examiner* — Darryl J Collins  
(74) *Attorney, Agent, or Firm* — Fish & Richardson P.C.

(57) ABSTRACT

A lens for non-prescription eyewear includes: a first surface having a first surface shape; and a second surface opposite the first surface, the second surface having a second surface shape, wherein the first surface includes a point of maximum curvature and the shape of the first surface measured along a line on the first surface decreases by at least 1.5 diopters at a distance 15 mm in every direction from the point of maximum curvature.

14 Claims, 11 Drawing Sheets

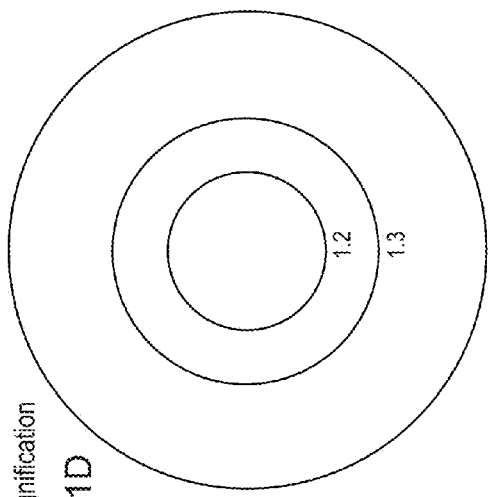
FIG. 1A Mean Power
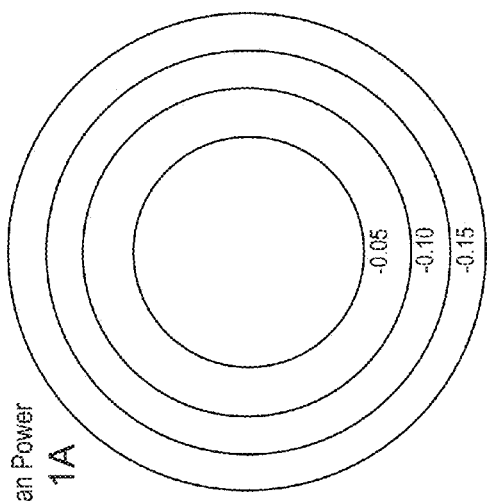
FIG. 1D Mean Magnification
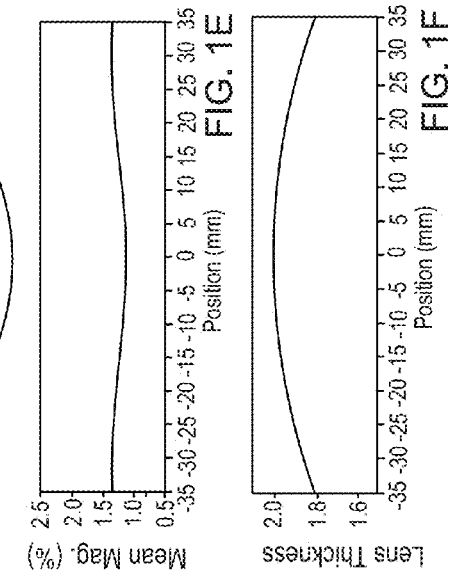
FIG. 1B
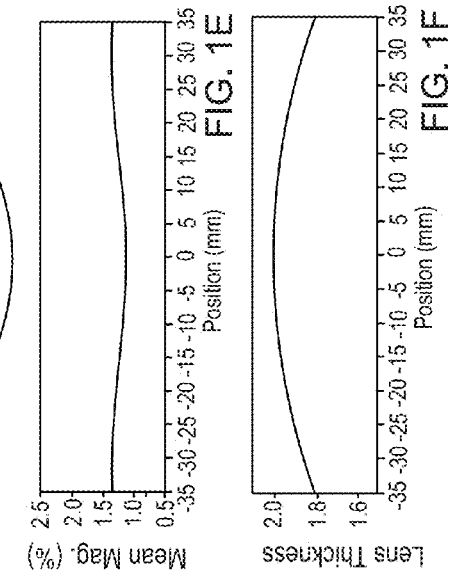
FIG. 1C
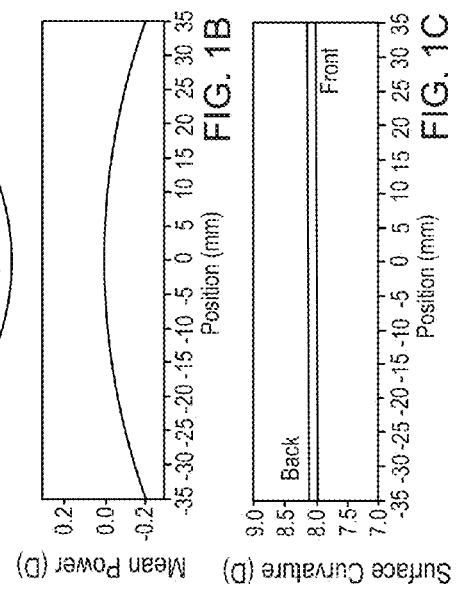
FIG. 1E
FIG. 1F

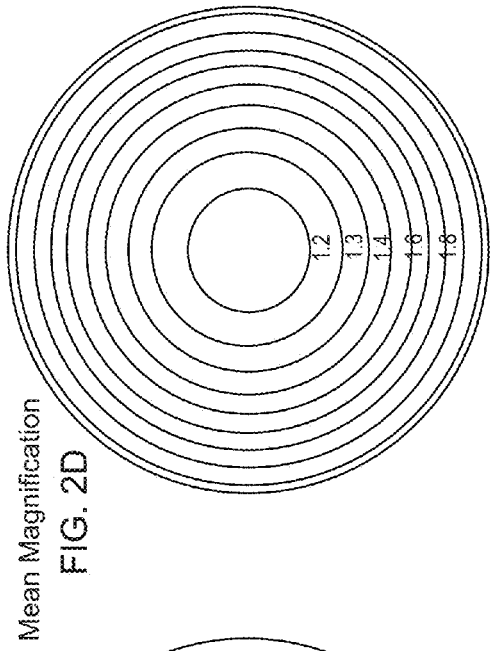
Mean Power
FIG. 2A
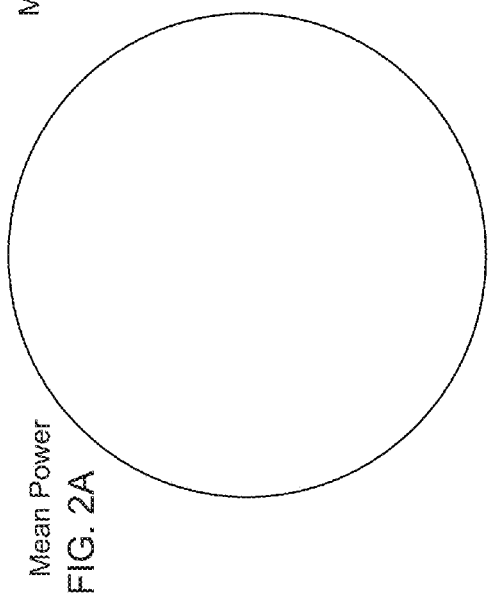
Mean Magnification
FIG. 2D
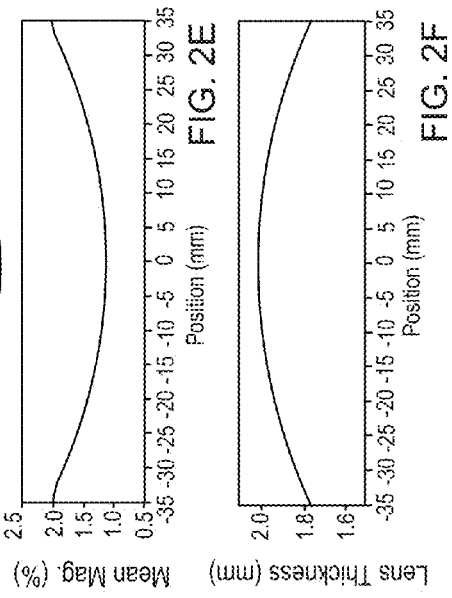
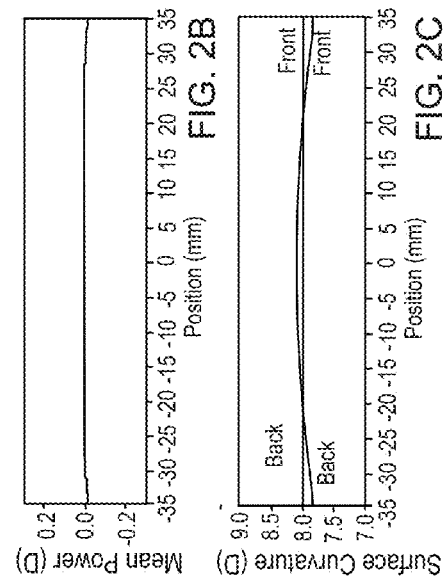

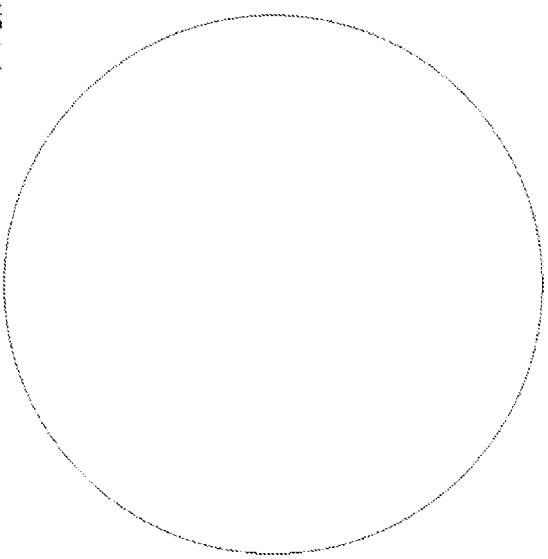
FIG. 3A Mean Power
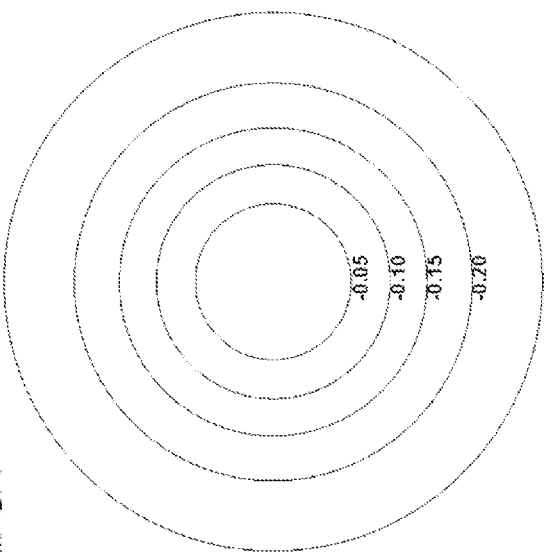
FIG. 3D Mean Magnification
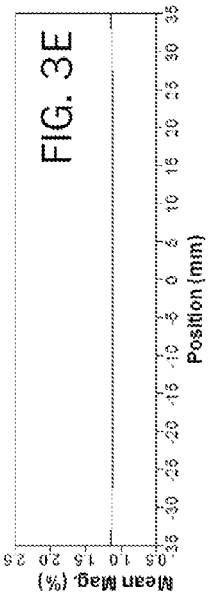
FIG. 3B
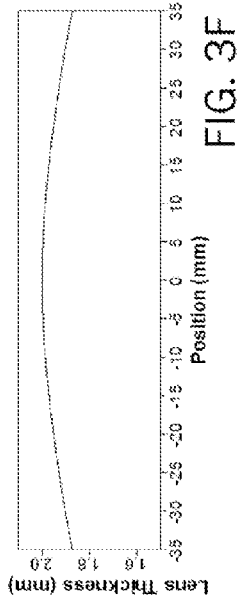
FIG. 3C
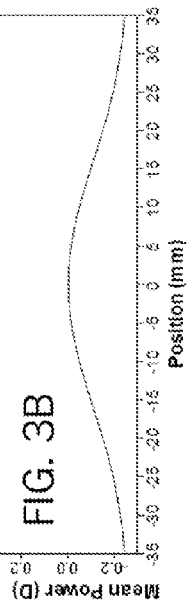
FIG. 3E
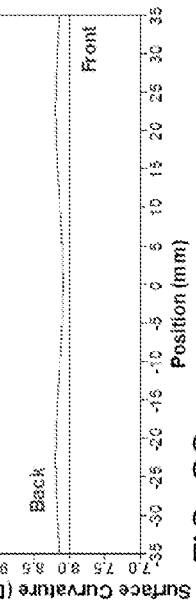
FIG. 3F

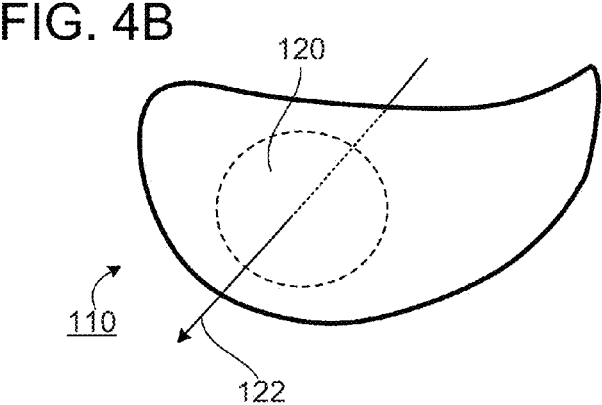
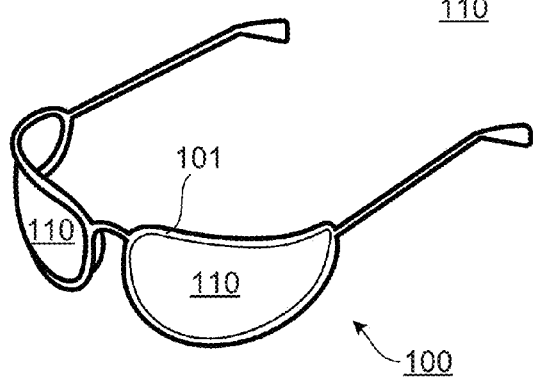
FIG. 4B
FIG. 4A

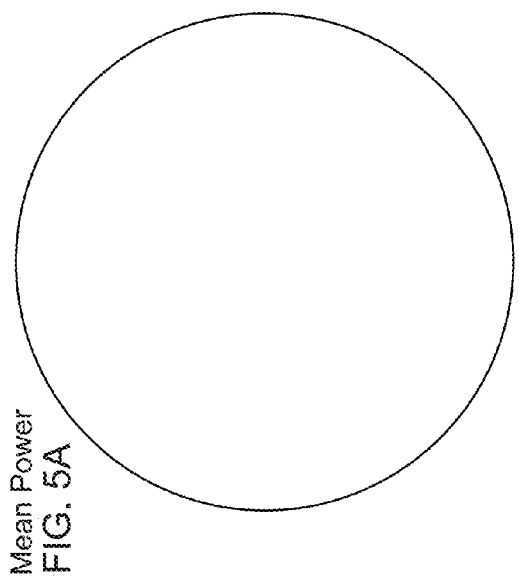
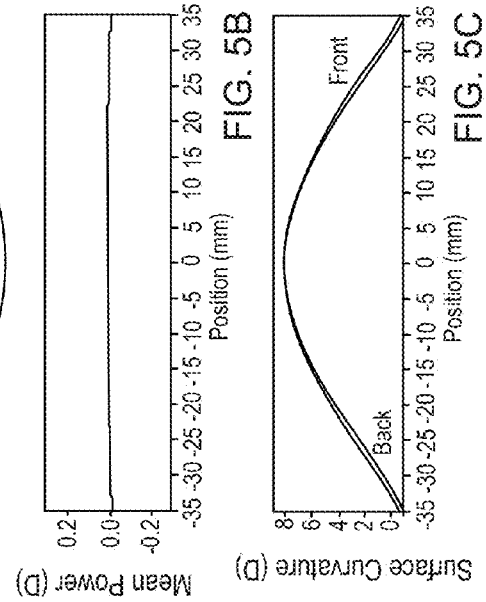
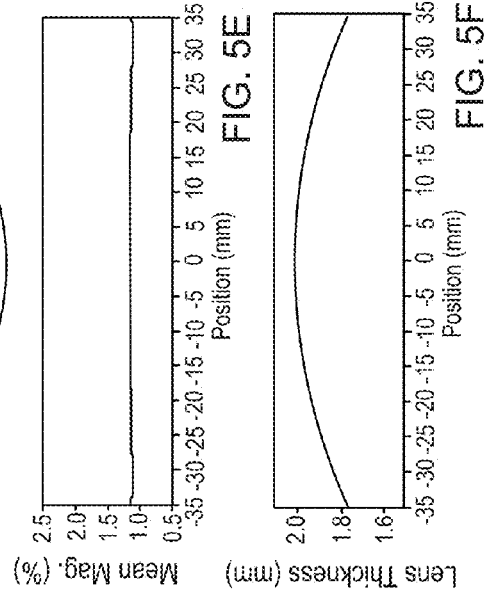
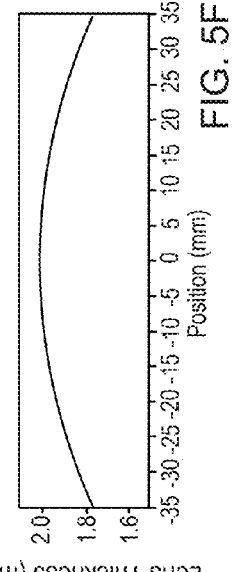

LOW DISTORTION EYEWEAR LENS WITH LOW OPTICAL POWER

CROSS-REFERENCE TO RELATED APPLICATIONS

The present application is a continuation of, and claims benefit under 35 U.S.C. §120 to, International Application PCT/US2011/062536, filed Nov. 30, 2011. The entire disclosure of International Application PCT/US2011/062536 is incorporated by reference herein.

BACKGROUND

This invention relates to lenses for eyewear, and more particularly to eyewear lenses having small power errors and low geometric distortion.

Spherical-plano lenses are used in a variety of eyewear, such as sunglasses, protective glasses and goggles (e.g., ski goggles, motorcycle goggles). Such eyewear are examples of non-prescription eyewear because they can be obtained without a prescription from an eyecare professional. Spherical plano lenses tend to suffer from small power errors and geometric distortion. As an example, FIGS. 1A and 1D are plots of the mean power error and magnification for an 8 base plano lens. FIG. 1A shows that the mean power of the lens varies from between 0.00 and −0.05 diopters for a zone at the center of lens to between −0.15 and −0.20 diopters for a zone at the lens' periphery. The variation in mean power is shown for a cross-section in FIG. 1B, where "position" refers to radial position in mm, FIG. 1C shows the surface curvature (in diopters) of the front and back surfaces of the lens. FIG. 1D shows the lens' magnification varying from 1.11% (i.e., 1.0111) to 1.12% (i.e., 1.0112) for a zone at the center, up to between 1.13% and 1.14% in at the lens' periphery. FIG. 1E shows a plot of mean magnification as a function of radial position for this lens, and FIG. 1F show a plot of lens thickness as a function of radius. The examples referred to here are 2 mm center thickness, 80 mm diameter polycarbonate lenses. The plotted magnification is the mean equivalent magnification.

It is possible to substantially eliminate one component of either of these errors, for example, mean power error or variations in the mean equivalent magnification, by aspherizing one of the lens surfaces. For example, by aspherizing one of the lens surfaces it is possible to substantially zero the mean power. Referring to FIGS. 2A through 2F, for example, one can optimize the back surface to substantially eliminate the mean power. The result is that the mean power varies by within a range from better than −0.05 diopters to +0.05 diopters across the lens (See, e.g., FIG. 2B, which shows that mean power is close to 0.0 across the lens diameter). However, the variation in magnification across the lens increases significantly (compare FIGS. 1D and 1E with FIGS. 2D and 2E, respectively). The variation in the mean magnification increases significantly, varying across the lens from slightly above 1.00% at the center, to 2.00% or more at the lens' periphery. FIG. 2F shows a plot of lens thickness (in mm) as a function of radius (in mm) for this lens.

Alternatively, it is possible to aspherize a lens surface to make the mean magnification substantially constant over the lens. For example, referring to FIGS. 3A through 3F, aspherizing one surface to minimize the variation in the mean magnification can provide a lens that has a magnification that is between 1.10% and 1.15% across its surface (see FIGS. 3D and 3E). However, evening out the mean magnification increases the variation of the mean power across the lens. FIGS. 3A and 3B show that the lens has a mean power that varies from 0.00 diopter at the center to less than −0.25 diopters at the periphery. Surface curvature as a function of radius (in mm) is shown for this lens in FIG. 3C, and lens thickness (in mm) as a function of radius (in mm) is shown in FIG. 3F. In general, surface curvature (in diopters) is determined as 530 divided by the surface radius of curvature in millimeters.

SUMMARY

It has been recognized that by varying the overall shape of the lens, one can substantially reduce (e.g., eliminate) both a component of the optical power and a measure of distortion for a curved lens. In other words, it is possible to substantially eliminate both types of errors (e.g., mean power and mean magnification) by aspherizing both lens surfaces. Such lenses are referred to herein as low distortion plano lenses.

Various aspects of the invention are summarized as follows.

In general, in one aspect, the invention features a lens for non-prescription eyewear, including: a first surface having a first surface shape; and a second surface opposite the first surface, the second surface having a second surface shape, wherein the first surface includes a point of maximum curvature and the shape of the first surface measured along a line between the point of maximum curvature and another point on the first surface decreases by at least 1.5 diopters at a distance 15 mm from the point of maximum curvature.

Embodiments of the lenses can include one or more of the following features. For example, the curvature can decrease monotonically in every direction from the point of maximum curvature. The shape of the first surface measured along a line along the first surface can decrease (e.g., monotonically) by at least 1.5 diopters at a distance 15 mm in every direction from the point of maximum curvature. The shape of the first surface measured along the line between the point of maximum curvature and the other point on the first surface can decrease (e.g., monotonically) by at least 3 diopters a distance 20 mm from the point of maximum curvature. The shape of the first surface measured along a line along the first surface can decrease (e.g., monotonically) by at least 3 diopters at a distance 20 mm in every direction from the point of maximum curvature. The curvature of the first surface measured along the line between the point of maximum curvature and the other point on the first surface can decrease (e.g., monotonically) at least 4 diopters a distance 25 mm from that point. The shape of the first surface measured along a line along the first surface can decrease (e.g., monotonically) by at least 3 diopters at a distance 20 mm in every direction from the point of maximum curvature.

The first and second surface shapes can define at least a portion of the lens having a dimension of at least 30 mm, where the portion includes the point of maximum curvature of the first surface and the first surface shape varies by at least 4 diopters over the portion. The first surface shape of the first surface can vary by at least 5 diopters over the portion (e.g., at least 6 diopters). The first surface can have a base curvature of 6 diopters or more (e.g., 7 diopters or more).

The first and second surface shapes can define at least a portion of the lens having a dimension of at least 30 mm, where the portion includes the point of maximum curvature of the first surface and a component of an optical power of the lens varies by less than 0.03 diopters over the portion.

The component of the optical power can be mean power, tangential power, sagittal power, or astigmatism. In some embodiments, the component of the optical power is mean power, and the mean power is in a range from −0.05 diopters to +0.05 diopters.

The portion can have a dimension of at least 40 mm (e.g., at least 50 mm).

A measure of distortion of the lens can vary by 0.10% or less (e.g., 0.05% or less, 0.02% or less) over the portion. The measure of distortion can be mean magnification, magnification aspect ratio, vertical magnification, or horizontal magnification.

The first surface can be an aspheric surface. The second surface can also be an aspheric surface.

The lens can have a mean power at the point of maximum curvature of the first surface in a range from −0.125 diopters to +0.125 diopters.

The lens can be a wrapped lens.

In another aspect, the invention features eyewear including the lens of any of the preceding claims. The eyewear can be a pair of eyeglasses (e.g., sunglasses) or a pair of goggles.

In general in another aspect, the invention features a lens for eyewear, including: a first surface having a first surface shape; and a second surface opposite the first surface, the second surface having a second surface shape, wherein the first and second surface shapes define at least a portion of the lens having a dimension of at least 30 mm, where a component of an optical power of the lens varies by less than 0.03 diopters over the portion and a measure of magnification varies by 0.10% or less over the portion. Embodiments of the lens can include one or more of the features discussed above with respect to the first aspect.

In general, in a further aspect, the invention features a lens for eyewear, including: a first surface having a first surface shape; and a second surface opposite the first surface, the second surface having a second surface shape, wherein the first and second surface shapes define at least a portion of the lens having a dimension of at least 30 mm, where a component of an optical power of the lens is in a range from −0.05 diopters to 0.05 diopters over the portion and the first surface shape varies by at least 4 diopters over the portion. Embodiments of the lens can include one or more of the features discussed above with respect to the first aspect.

The details of one or more embodiments of the invention are set forth in the accompanying drawings and the description below. Other features and advantages will be apparent from the description and the claims.

BRIEF DESCRIPTION OF THE DRAWINGS

FIG. 1A is a contour plot of mean power in diopters for an embodiment of a lens.

FIG. 1B is a plot of mean power (in diopters) as a function of lens radius (in mm) for the lens of FIG. 1A.

FIG. 1C is a plot of surface curvature (in diopters) as a function of lens radius (in mm) for the front and back surfaces of the lens of FIG. 1A.

FIGS. 1D is a contour plot of mean magnification as a percentage for lens of FIG. 1A.

FIG. 1E is a plot of mean magnification as a function of lens radius (in mm) for the lens of FIG. 1A.

FIG. 1F is a plot of lens thickness (in mm) as a function of lens radius (in mm) for the lens of FIG. 1A.

FIG. 2A is a contour plot of mean power in diopters for another embodiment of a lens.

FIG. 2B is a plot of mean power (in diopters) as a function of lens radius (in mm) for the lens of FIG. 2A.

FIG. 2C is a plot of surface curvature (in diopters) as a function of lens radius (in mm) for the front and back surfaces of the lens of FIG. 2A.

FIG. 2D is a contour plot of mean magnification as a percentage for lens of FIG. 2A.

FIG. 2E is a plot of mean magnification as a function of lens radius (in mm) for the lens of FIG. 2A.

FIG. 2F is a plot of lens thickness (in mm) as a function of lens radius (in mm) for the lens of FIG. 2A.

FIG. 3A is a contour plot of mean power in diopters for a further embodiment of a lens.

FIG. 3B is a plot of mean power (in diopters) as a function of lens radius (in mm) for the lens of FIG. 3A.

FIG. 3C is a plot of surface curvature (in diopters) as a function of lens radius (in mm) the front and back surfaces of for the lens of FIG. 3A.

FIG. 3D is a contour plot of mean magnification as a percentage for lens of FIG. 3A.

FIG. 3E is a plot of mean magnification as a function of lens radius (in mm) for the lens of FIG. 3A.

FIG. 3F is a plot of lens thickness (in mm) as a function of lens radius (in mm) for the lens of FIG. 3A.

FIG. 4A is a perspective view of an embodiment of eyeglasses that include lenses with low distortion and low optical power.

FIG. 4B is a perspective view of an embodiment of a low distortion plano lens.

FIG. 5A is a contour plot of mean power in diopters for an embodiment of a low distortion plano lens.

FIG. 5B is a plot of mean power (in diopters) as a function of lens radius (in mm) for the lens of FIG. 5A.

FIG. 5C is a plot of surface curvature (in diopters) as a function of lens radius (in mm) for the front and back surfaces of the lens of FIG. 5A.

FIG. 5D is a contour plot of mean magnification as a percentage for lens of FIG. 5A.

FIG. 5E is a plot of mean magnification as a function of lens radius (in mm) for the lens of FIG. 5A.

FIG. 5F is a plot of lens thickness (in mm) as a function of lens radius (in mm) for the lens of FIG. 5A.

Like reference symbols in the various drawings indicate like elements.

DETAILED DESCRIPTION

Figure 6A:
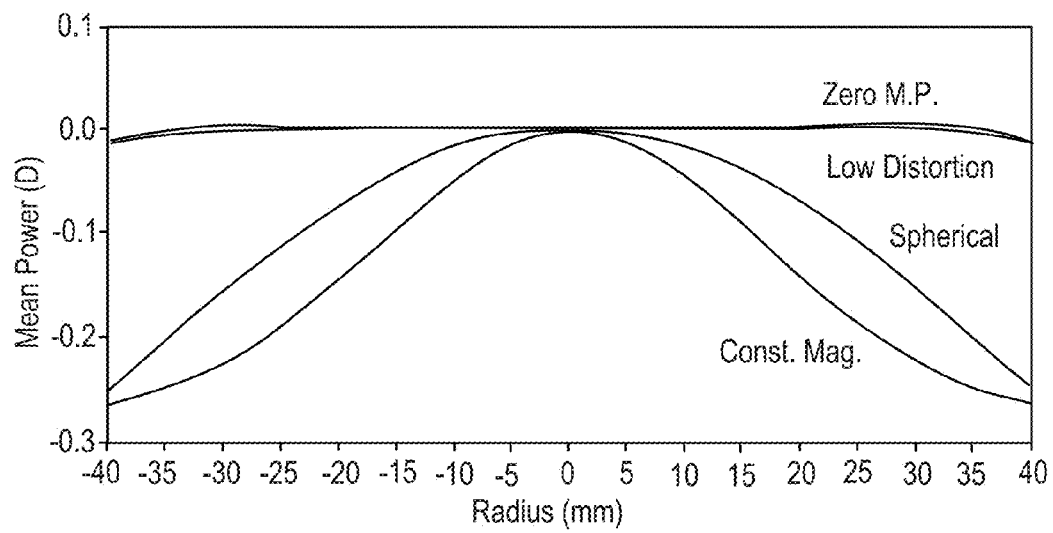
FIGS. 6A and 6B are plots comparing mean power in diopters and magnification as a percentage, respectively, as a function of radius, for the lenses corresponding to the contour plots shown in FIGS. 1A-F, 2A-F, 3A-F, and 5A-F.

Referring to FIGS. 4A-4B, a pair of eyeglasses 100 includes frames 101 and lenses 110. The surfaces of lenses 110 are both aspheric lenses and are curved in a way so that the lenses have a negligible mean power over at least a portion 120 of the lens. Mean power (also known as mean oblique power or mean oblique error) refers to the average of $F_1$ the through power in one principle meridian along a given line of sight and $F_2$ the through power in the other principal meridian along that line of sight. Mathematically, mean power can be expressed as:

$$MeanPower = \frac{F_1 + F_2}{2}$$

See, e.g., *Clinical Optics,* 2nd Ed., Troy E. Fannin and Theodore Grosvenor, Butterworth-Heinemann pp. 134-135, 144 (St. Louis, Mo., 1996), and *Borish's Clinical Refraction,* 2nd Ed., William J. Benjamin, Butterworth-Heinemann pp 1069 (St. Louis, Mo. 2006).

The mean power of lenses 110 can be in a range from −0.05 diopters (e.g., −0.04 diopters, −0.03 diopters, −0.02 diopters, −0.01 diopters) to +0.05 diopters (e.g., +0.04 diopters, +0.03 diopters, +0.02 diopters, +0.01 diopters) over portion 120. Lenses 110 can also have a low mean power error. In other words, there can be minimal variation in the mean power across portion 120. For example, lenses 110 have a mean power that varies by 0.05 diopters or less (e.g., 0.04 diopters or less, 0.03 diopters or less, 0.02 diopters or less, 0.01 diopters or less) over portion 120.

In addition to having a low mean power error, lenses 110 have low distortion over portion 120. Distortion of the lens refers to the variation in magnification over the surface of the lens. Magnification refers to the ratio between the apparent size of an object as viewed through the lens divided by the size of the viewed without the lens. See, e.g., *Clinical Optics*, pp. 125, 139-140 and *Borish's Clinical Refraction* pp. 1072, 1074. Ideally, lenses 110 would introduce no distortion at all (i.e., constant magnification). In other words, the lenses would not distort the image by presenting differing magnification of the image depending upon which part of the lens the image is viewed with. More generally, however, as used herein, low distortion means that at least one measure of magnification is effectively constant over portion 120 of the lenses. For example, the mean magnification of lens 110 can be vary by 0.5% or less over portion 120 (e.g., 0.40% or less, 0.30% or less, 0.20% or less, 0.10% or less, 0.05% or less, 0.04% or less, 0.03% or less, 0.02% or less, 0.01% or less). In some embodiments, lenses are shaped so that the magnification aspect ratio varies 0.5% or less over portion 120 (e.g., 0.40% or less, 0.30% or less, 0.20% or less, 0.10% or less, 0.05% or less, 0.04% or less, 0.03% or less, 0.02% or less, 0.01% or less). Alternatively, or additionally, the lenses can be shaped to ensure that horizontal and/or vertical magnification varies by 0.5% or less over portion 120 (e.g., 0.40% or less, 0.30% or less, 0.20% or less, 0.10% or less, 0.05% or less, 0.04% or less, 0.03% or less, 0.02% or less, 0.01% or less). In general, the mean magnification over portion 120 can be one (i.e., the image and object are the same size), less than one (i.e., the image is smaller than the object being viewed) or more than one (i.e., the image is larger than the object). In some embodiments, the mean magnification over portion 120 is slightly greater than 1, e.g., between 1.001 and 1.020 across the lens.

In general, lenses 110 have a surface shape that can vary significantly over the surface of the lens. For example, lenses 110 can have a surface curvature that varies by 5 diopters or more (e.g., 6 diopters or more, 7 diopters or more, 8 diopters or more) across portion 120. Typically, lenses 110 have a maximum surface curvature at their center (i.e., coinciding with direction 122) and the surface curvature reduces monotonically towards the periphery of the lens. For example, the surface curvature at the center of the lens can be −5 diopters or more (e.g., +6 diopters or more, −7 diopters or more, +8 diopters or more). The surface curvature at or near the periphery of the lens can be +1 diopters or less (e.g., at or close to 0 diopters). In some embodiments, lens 110 has a negative surface curvature at the periphery. The surface curvature can change by −0.10 D/mm or more (e.g., −0.20 D/mm or more, −0.30 D/mm or more, −0.40 mm or more, −0.50 D/mm or more) from the center of the lens outwards, across portion 120.

Portion 120 is a zone that covers the center of gaze (along direction 122) when the wearer looks straight ahead. Portion 120 has a dimension (e.g., a diameter in at least one direction) of at least 30 mm (e.g., 35 mm or more, 40 mm or more, 45 mm or more, 50 mm or more). In some embodiments, portion 120 covers the entire lens.

Where the wearer's eye is situated between 21 mm to 33 mm (e.g., about 27 mm) behind the lens along direction 122, portion 120 can subtend an eye rotation angle of about +/−30° (e.g., +/−45°, +/−60°.)

In general, lenses 110 can be designed using a variety of methods. Generally, such methods involve some form of numerical optimization. Conventional optical design software can be used for this purpose. For example, ray tracing programs such as CODE V (from Optical Research Associates, Pasadena Calif.) and Zemax® (from Radiant ZEMAX LLC, Bellevue, Wash.) can be used.

In certain implementations, design of the lenses begins with the designer designating initial curvatures for the two lens surfaces and defining the metrics and their values which the lens is to satisfy (e.g., a desired range for a component of the optical power and a desired range for a measure of the lens magnification). The designer then uses a ray tracing program to determine the values for these metrics for the initial design. Based on these values, the design is changed (e.g., by varying aspheric coefficients for one or both of the lens surfaces). The design change can be implemented algorithmically, by the software, based on the metric values, or can be done manually by the designer. The ray tracing software then determines values for the metrics for the changed design. The process is iterated until the values for the design metrics are within the designated ranges.

Mean power for an exemplary lens are shown in FIGS. 5A and 5B. Mean magnification for this lens is shown in FIGS. 5D and 5E. In this example, it was assumed that the front surface of the lens was required to have an 8 diopter curve at the center, e.g., for cosmetic reasons. The front surface was specified, and then the back surface was numerically optimized to produce a lens with near zero mean power (between −0.02 and 0.01 diopters, see FIGS. 5A and 5B). The mean magnification of the lens is between 1.12% and 1.14% across the lens (see FIGS. 5D and 5E). FIG. 5C shows the surface curvature (in diopters) for the front and back surfaces for this lens. FIG. 5F shows lens thickness (in mm) as a function of radius (in mm).

Figure 6B:
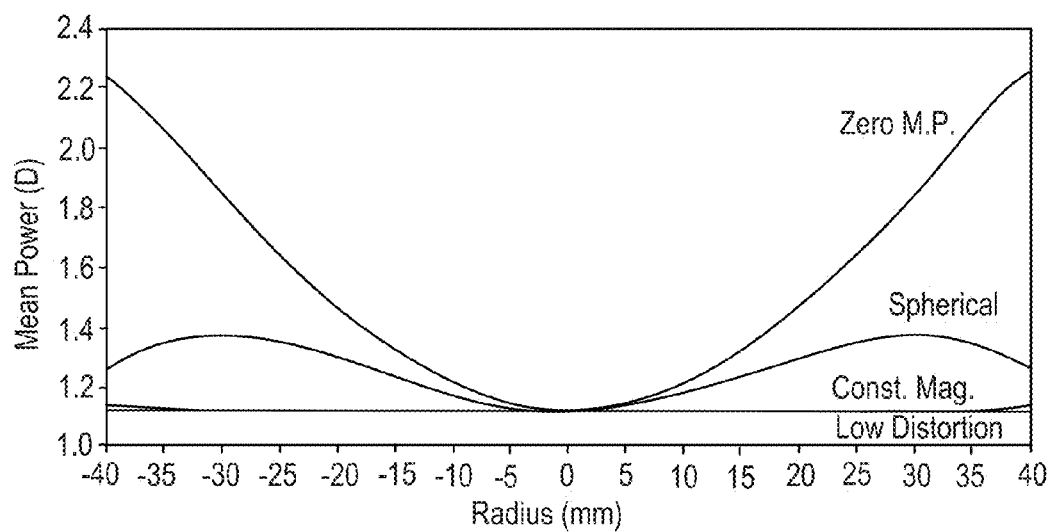

The lens examples discussed above with respect to FIGS. 1A-3F and 5A-5F are further compared in plots shown in FIGS. 6A and 6B. FIG. 6A compares the mean power in diopters as a function of radial position on each lens. FIG. 6B compares the mean magnification as a function of radial position for the same lenses. The traces for the spherical lens, described above in connection with FIGS. 1A and 1B, are labeled "Spherical" The traces for the minimized mean power lens, described above in connection with FIGS. 2A and 2B, are labeled "Zero M.P." The traces for the minimized mean magnification lens, described above in connection with FIGS. 3A and 3B, are labeled "Const. Mag." The traces for the dual asphere lens, described above in connection with FIGS. 5A and 5B, are labeled "Low distortion"

Figure 7:
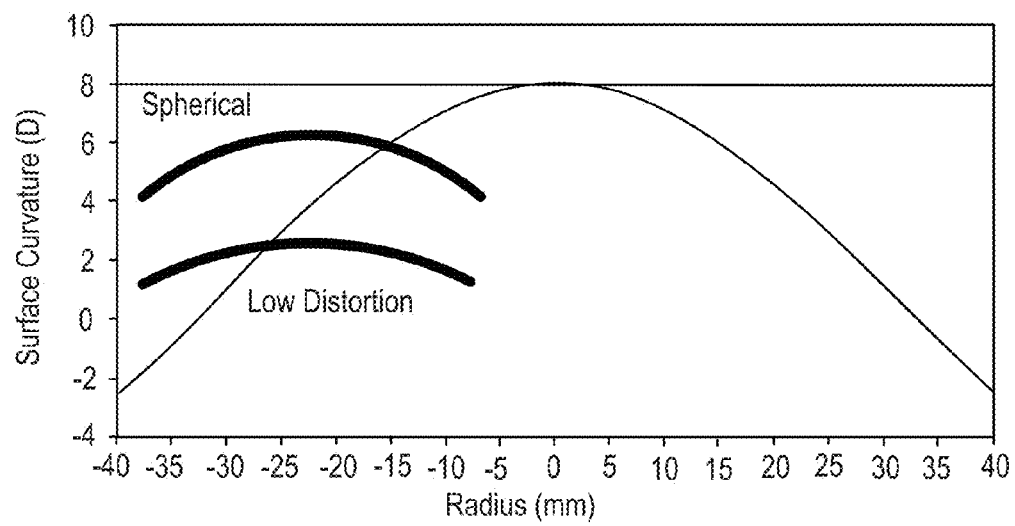
FIG. 7 compares the tangential curvature in diopters as a function of radius of the front surface of the low distortion plano lens corresponding to FIGS. 5A through 5F and that of the spherical lens corresponding to the contour plots shown in FIGS. 1A through 1F. The insets compare the cross-sectional shape of these lenses.

In some embodiments, lenses 110 have a curvature that includes portions with positive curvature and portions with negative curvature. For example, FIG. 7 compares plots of the tangential curvature (the surface curvature measured along any meridian radially away from the center of the lens, in diopters) of the front surfaces for the "Spherical" example and the "Low distortion" as a function of radius. As can be seen from the plot, the tangential power, a measure of the local curvature of the lens, changes by more than 10 diopters over the surface, from +8 diopters at the lens center to less than −2 diopters at the periphery. In other words, the lens goes from being highly convex at the center to slightly concave at the edge. In contrast, the tangential curvature of the front surface of the spherical lens is constant at +8 across the lens. The insets in FIG. 7 compare the cross-sectional shape of the "Spherical" lens to the shape of the "Low distortion"

Generally, the surface height of a rotationally symmetric asphere can be expressed as a polynomial, e.g., with non-zero even coefficients. Mathematically, this can be expressed as:

$$z(r) = \sum_i a_i r^i,$$

where, z refers to the surface height of the lens surface, r is the lens radius, measured from its center, $\alpha_i$ are the polynomial coefficients optimized for the lens, and i=0, 2, 4, 6 . . . . For the example presented above (i.e., the low distortion lens surface whose tangential curvature of the front surface is shown in FIG. 7), the non-zero coefficients, for r in millimeters, are as follows:

$a_2$=0.0075472;
$a_4$=1.13×10$^{-6}$;
$a_6$=1.2×10$^{-10}$;
$a_8$=−5.0×10$^{-14}$.

Figure 8:
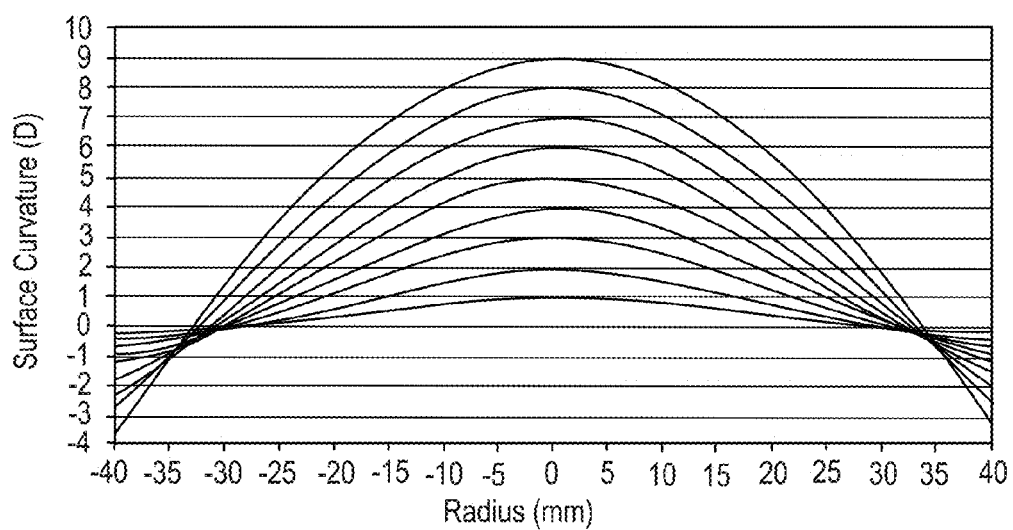
FIG. 8 compares the tangential curvature in diopters as a function of radius for front surface of the low distortion plano lenses having different central curvatures.

The foregoing examples were with respect to an 8 base, at the center, lens. More generally, the principles for reducing power and distortion in a lens can be also applied to lenses having other centrals curvatures. In general, lower central curvature lenses can require less surface aspherization to accomplish similar optical corrections. FIG. 8 shows exemplary for bases 0 through 9 at the lens center. Each design used numerical optimization for the mean power correction while the magnification was adjusted by manually manipulating surface power parameters. In each case, a surface of the lens becomes concave at the periphery, with zero curvature between 30 mm and 35 mm from center.

Figure 9A:
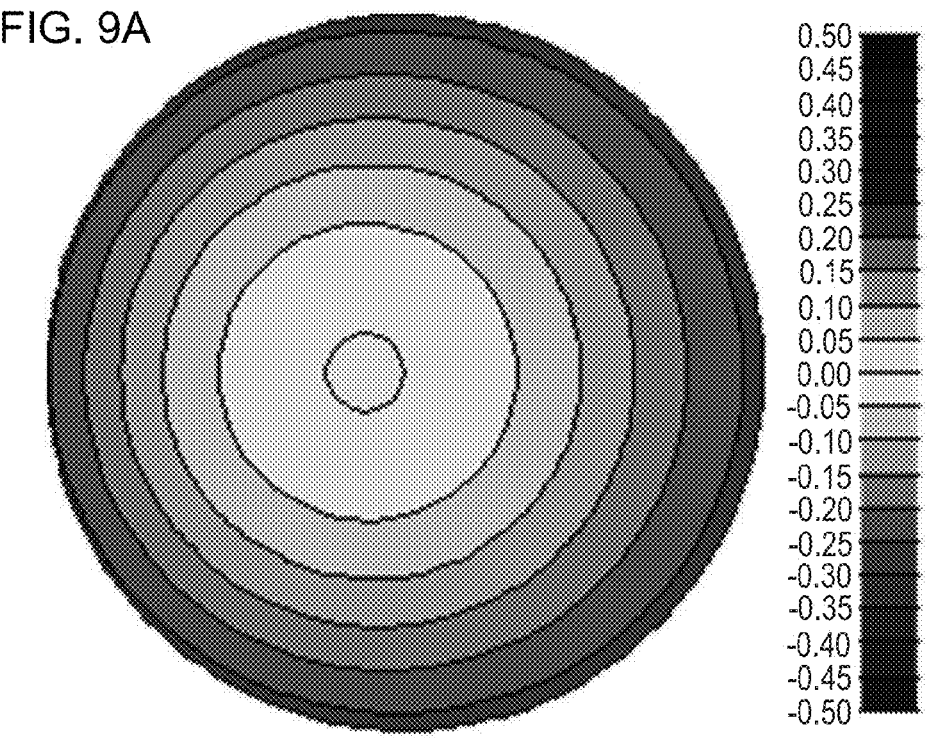
FIGS. 9A and 9B are contour plots of mean power in diopters and mean magnification as a percentage, respectively, for an embodiment of a lens with wrap.
Figure 9B:
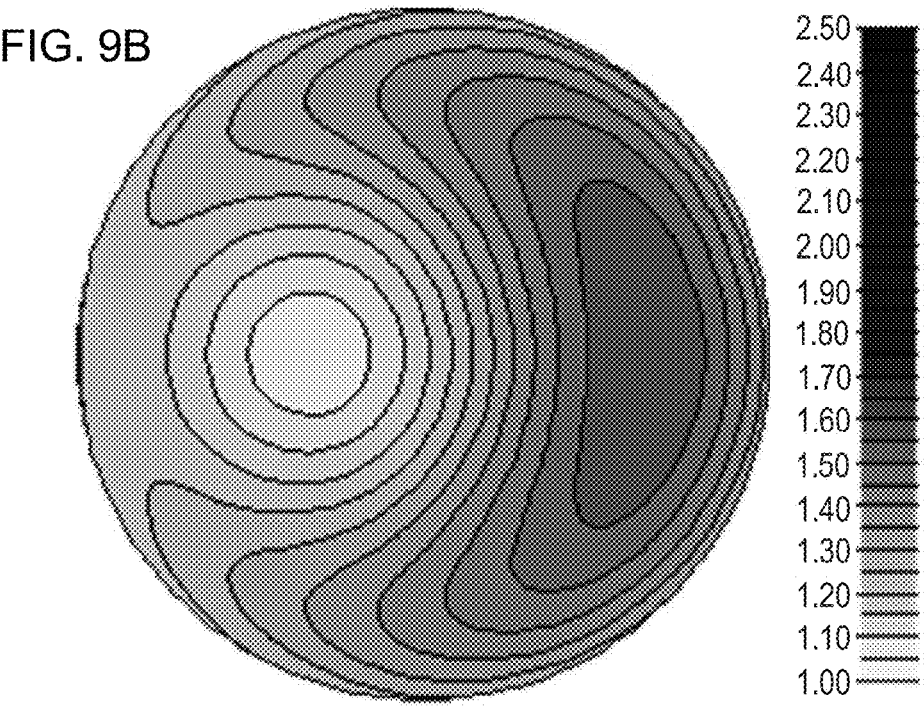
Figure 10A:
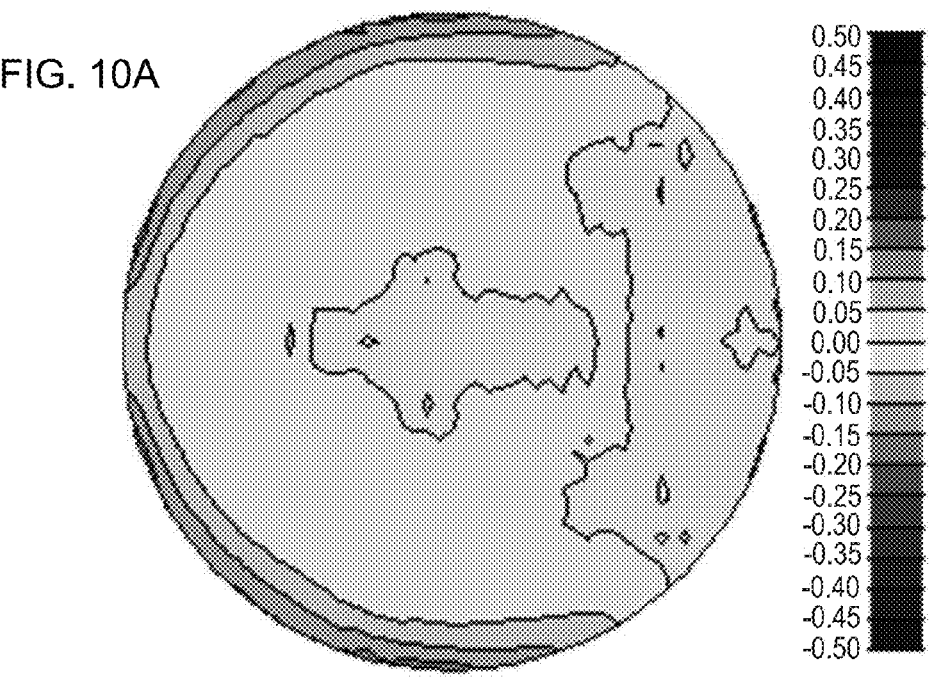
FIGS. 10A and 10B are contour plots of mean power in diopters and mean magnification as a percentage, respectively, for an embodiment of a low distortion plano lens with wrap.
Figure 10B:
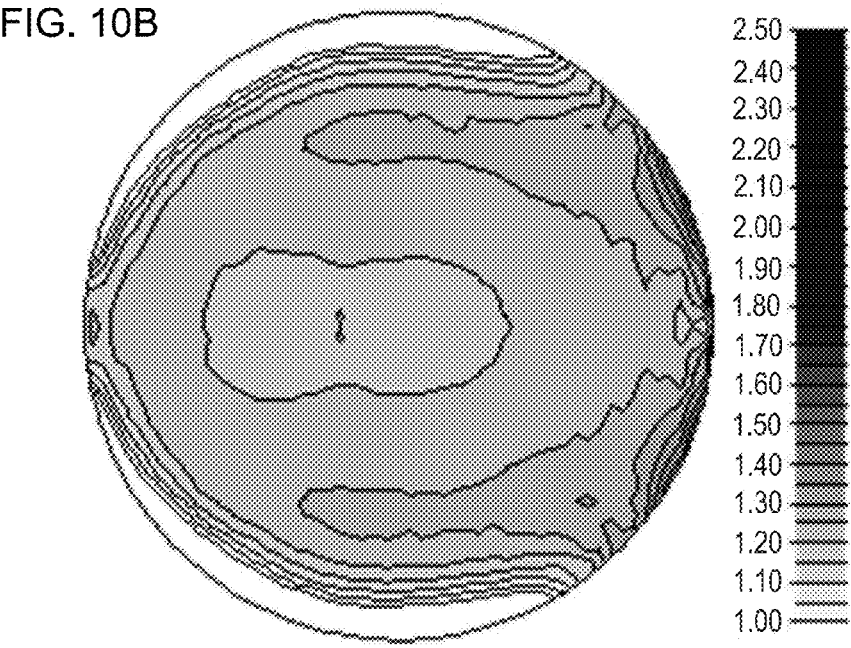

In some embodiments, the principles for reducing power and distortion are applied to lenses having lens wrap. Lens wrap refers to the angle between the direction of gaze and a line tangent to the front surface of the lens in a horizontal plane that intersects the lens through the line of sight. Lenses having lens wrap can conform more closely to the sides of a wearer's face than lenses without wrap. For example, FIGS. 9A and 9B show plots of mean power and mean magnification, respectively, for an 8 base lens with 15 degrees of wrap (of the front surface, in front of the eye, coordinate (0,0) on the plots and graphs). In some embodiments, wrap angles can range up to about 25 degrees. By way of comparison, FIGS. 10A and 10B show plots of mean power and mean magnification for an 8 base lens with 15 degrees of wrap, with reduced mean power variation and mean magnification variation. The tangential curvature at the temporal edge dips below −4 diopters (concave), and the mean power drops to almost −0.10 diopters at that edge in order to keep the magnification roughly constant. Of course other compromises are possible. For example, if it is desired that no portion of a lens surface be concave, one could allow some mean power error near the lens periphery and/or allow a wider range of magnification variation near the periphery.

Figure 11A:
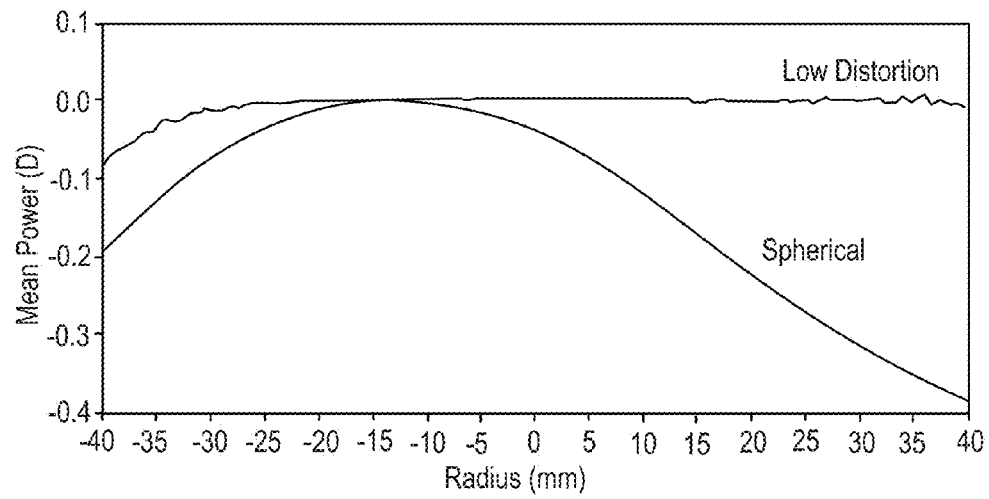
FIGS. 11A and 11B are plots comparing mean power in diopters and magnification as a percentage, respectively, as a function of radius along the horizontal meridian, for the lenses corresponding to the contour plots shown in FIGS. 9A-B and 10A-B.
Figure 11B:
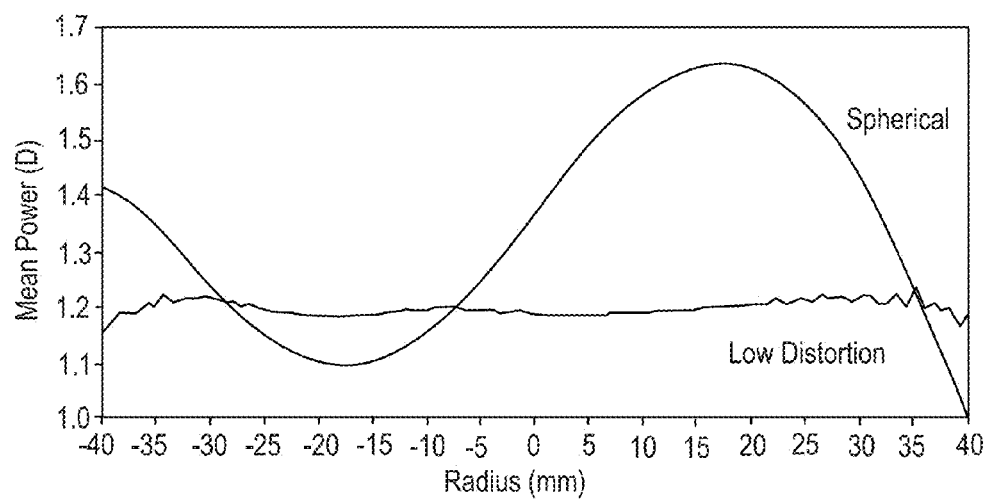

FIG. 11A is a plot comparing the mean power of the wrapped dual asphere lens ("Low distortion") to the wrapped spherical lens ("Spherical") along the horizontal meridian. FIG. 11B is a plot comparing the mean magnification of the wrapped dual asphere lens ("Low distortion") to the wrapped spherical lens ("Spherical") along the horizontal meridian.

Alternatively, or additionally, the principles for reducing power and distortion can be applied to lenses having rake. Lens rake, which is also referred to as pantoscopic tilt, refers to the extent to which the lower edge of the lens curves towards the wearer's face, and can vary from 0 degrees up to about 15 degrees.

Figure 12:
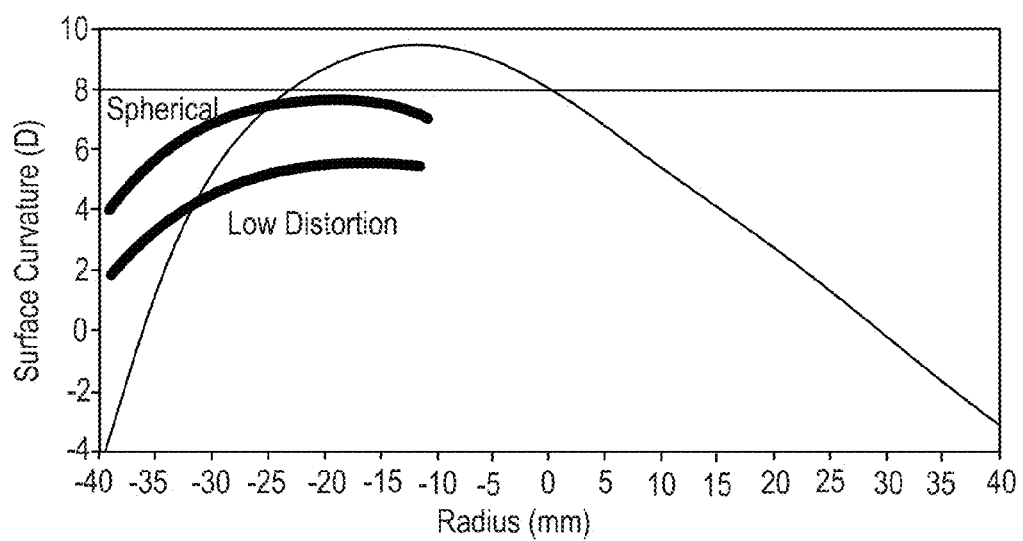
FIG. 12 compares the tangential power in diopters as a function of radius of the low distortion plano lens corresponding to FIGS. 10A and 10B and the spherical lens corresponding to the contour plots shown in FIGS. 9A and 9B. The insets compare the cross-sectional shape of these lenses.

The tangential curvatures of the front surfaces, along with the lens horizontal cross sections for the two wrapped lenses are also shown in FIG. 12. The main difference in the shape of the front surface, relative to the zero wrap lens, is that the peak curvature is displaced from the center. Keeping the curvature at the center of the lens, at 8 diopters forced the maximum curvature to increase to over 9 diopters at a location 12 mm to the temple side of center. The slopes of the tangential curvature plot are also skewed, sloping more gradually to the nasal side, and more steeply to the temporal side, than the zero distortion surface for the warp free lens.

While the aforementioned examples use mean power as a metric for characterizing the lens' optical power, more generally, the lens surfaces can be optimized for other components of optical power. For example, the lens surfaces can be shaped to reduce values of mean power, tangential (T) power, sagittal (S) power, and/or astigmatism. For a description of these parameters, see, e.g., *Clinical Optics*, pp. 134-135, 144.

Moreover, the lenses can be optimized based on combinations of the components of magnification other than mean magnification, for example the ratio of vertical to horizontal magnification; or can be based on individual components such as horizontal magnification, vertical magnification, or magnification along any other meridian.

While the foregoing examples are optimized for low mean optical power (e.g., as close to zero as possible), in general, the principles disclosed herein can also be applied to lenses with non-zero optical power. For example, in certain embodiments, lenses can be designed to have a substantially constant non-zero mean power over portion 120 (e.g., a substantially constant optical power between +/−0.125 diopters). In some embodiments, the lens can have a non-zero mean power at the center of the lens (e.g., in a range from +/−0.125 diopters) and the mean power can vary by +/−0.05 diopters from the mean power at the center of the lens over portion 120 (e.g., over the entire lens).

In general, surface properties of lenses can be measured in a variety of ways. For example, surface properties can be measured using a co-ordinate measuring machine ("CMM") (e.g., tools available from Brown & Sharpe, North Kingstown, R.I., or CONTURA G2 or ACCURA measurement platforms available from Carl Zeiss IMT). A curvature profile for a lens surface can be calculated directly from surface coordinates measured using a CMM. Lens properties can be determined by measuring both lens surfaces and then using optical simulation software (e.g., commercial ray tracing software) to determine lens characteristics such as distortion and mean power from of the lens.

The lenses can be made based on the design using conventional lens making techniques. For example, the lenses can be ground from lens blanks in the same way as, for example, single vision and multi-vision lenses (e.g., bi-focal lenses or progressive lenses) are made. In some embodiments, free-form grinding can be used. In certain embodiments, the lenses can be molded.

Conventional lens materials can be used. For example, lenses can be made from glass (e.g., optical crown glass) or plastic (e.g., CR-39, Trivex, polycarbonate, polyurethanes).

The lenses can include any variety of conventional optical coatings or materials, such as hard coats, UV protective coatings, anti-reflection coatings, smudge resistant coatings, photochromic materials, tints etc.

Other embodiments are in the following claims.

What is claimed is:

1. A spectacle lens, comprising:
   a first surface having a first surface shape; and
   a second surface opposite the first surface, the second surface having a second surface shape,
   wherein the first and second surfaces are aspherized to reduce both a component of optical power and reduce a measure of distortion of the lens such that
   the first surface includes a point of maximum curvature and the curvature of the first surface measured along a line between the point of maximum curvature and any other point on the first surface decreases by at least 1.5 diopters at a distance 15 mm from the point of maximum curvature,
   the first and second surface shapes define at least a portion of the lens having a diameter of at least 30 mm such that the portion includes the point of maximum curvature of the first surface, a component of an optical power of the lens varies by less than 0.03 diopters over the portion, and
   a measure of distortion of the lens varies by 0.1% or less over the portion.

2. The lens of claim 1, wherein the curvature decreases monotonically in every direction from the point of maximum curvature.

3. The lens of claim 1, wherein the measure of distortion is mean magnification, magnification aspect ratio, vertical magnification, or horizontal magnification.

4. The lens of claim 1, wherein the component of the optical power is mean power, tangential power, sagittal power, or astigmatism.

5. The lens of claim 1, wherein the first surface has a base curvature of 6 diopters or more.

6. The lens of claim 1, wherein the first surface has a base curvature of 7 diopters or more.

7. The lens of claim 1, wherein the shape of the first surface measured along the line between the point of maximum curvature and another point on the first surface decreases by at least 3 diopters a distance 20 mm from the point of maximum curvature.

8. A method for producing a lens, comprising:
   shaping a first surface of the lens to have a first surface shape;
   shaping a second surface of the lens opposing the first surface to have a second surface shape;
   wherein shaping the first and second surfaces comprises aspherizing both surfaces to both reduce a component of an optical power of the lens and reduce a measure of distortion of the lens such that
   the first surface includes a point of maximum curvature and the curvature of the first surface measured along a line between the point of maximum curvature and any other point on the first surface decreases by at least 1.5 diopters at a distance 15 mm from the point of maximum curvature,
   the first and second surface shapes define at least a portion of the lens having a diameter of at least 30 mm such that the portion includes the point of maximum curvature of the first surface, a component of an optical power of the lens varies by less than 0.03 diopters over the portion, and
   a measure of distortion of the lens varies by 0.1% or less over the portion.

9. The method of claim 8, wherein the curvature decreases monotonically in every direction from the point of maximum curvature.

10. The method of claim 8, wherein the measure of distortion is mean magnification, magnification aspect ratio, vertical magnification, or horizontal magnification.

11. The method of claim 8, wherein the component of the optical power is mean power, tangential power, sagittal power, or astigmatism.

12. The method of claim 8, wherein the first surface has a base curvature of 6 diopters or more.

13. The method of claim 8, wherein the first surface has a base curvature of 7 diopters or more.

14. The method of claim 8, wherein the shape of the first surface measured along the line between the point of maximum curvature and another point on the first surface decreases by at least 3 diopters a distance 20 mm from the point of maximum curvature.

* * * * *